US008929019B2

(12) United States Patent
Tagami et al.

(10) Patent No.: US 8,929,019 B2
(45) Date of Patent: Jan. 6, 2015

(54) READ/WRITE APPARATUS AND READ/WRITE METHOD

(71) Applicant: Kabushiki Kaisha Toshiba, Tokyo (JP)

(72) Inventors: Naoki Tagami, Yokohama (JP); Masahide Kanegae, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/719,778

(22) Filed: Dec. 19, 2012

(65) Prior Publication Data

US 2014/0029133 A1   Jan. 30, 2014

(30) Foreign Application Priority Data

Jul. 26, 2012   (JP) ................. 2012-166262

(51) Int. Cl.
*G11B 21/02* (2006.01)
*G11B 27/36* (2006.01)
*G11B 21/10* (2006.01)
*G11B 5/596* (2006.01)
*G11B 19/04* (2006.01)

(52) U.S. Cl.
CPC .......... *G11B 21/106* (2013.01); *G11B 5/59627* (2013.01); *G11B 19/045* (2013.01)
USPC ............................................. 360/75; 360/31

(58) Field of Classification Search
None
See application file for complete search history.

(56) References Cited

U.S. PATENT DOCUMENTS

| | | | | |
|---|---|---|---|---|
| 4,556,920 A | * | 12/1985 | Maeda et al. | 360/77.06 |
| 6,909,566 B1 | | 6/2005 | Zaitsu et al. | |
| 2010/0290151 A1 | | 11/2010 | Kondo et al. | |
| 2012/0281304 A1 | * | 11/2012 | Jin et al. | 360/31 |
| 2013/0201579 A1 | * | 8/2013 | Springberg et al. | 360/75 |

FOREIGN PATENT DOCUMENTS

| | | |
|---|---|---|
| JP | 2001-319433 A | 11/2001 |
| JP | 2010-267346 A | 11/2010 |
| WO | WO 01/59767 A1 | 8/2001 |

* cited by examiner

*Primary Examiner* — Andrew L Sniezek
(74) *Attorney, Agent, or Firm* — Knobbe Martens Olson & Bear LLP

(57) ABSTRACT

According to at least one embodiment, a read/write apparatus includes a read module and a positioning module. The read module reads data of a predetermined data track using a read head. The positioning module positions the read head in accordance with an index indicating how much the read head reads data of a neighboring data track of the predetermined data track when the read head reads data of the predetermined data track.

4 Claims, 7 Drawing Sheets

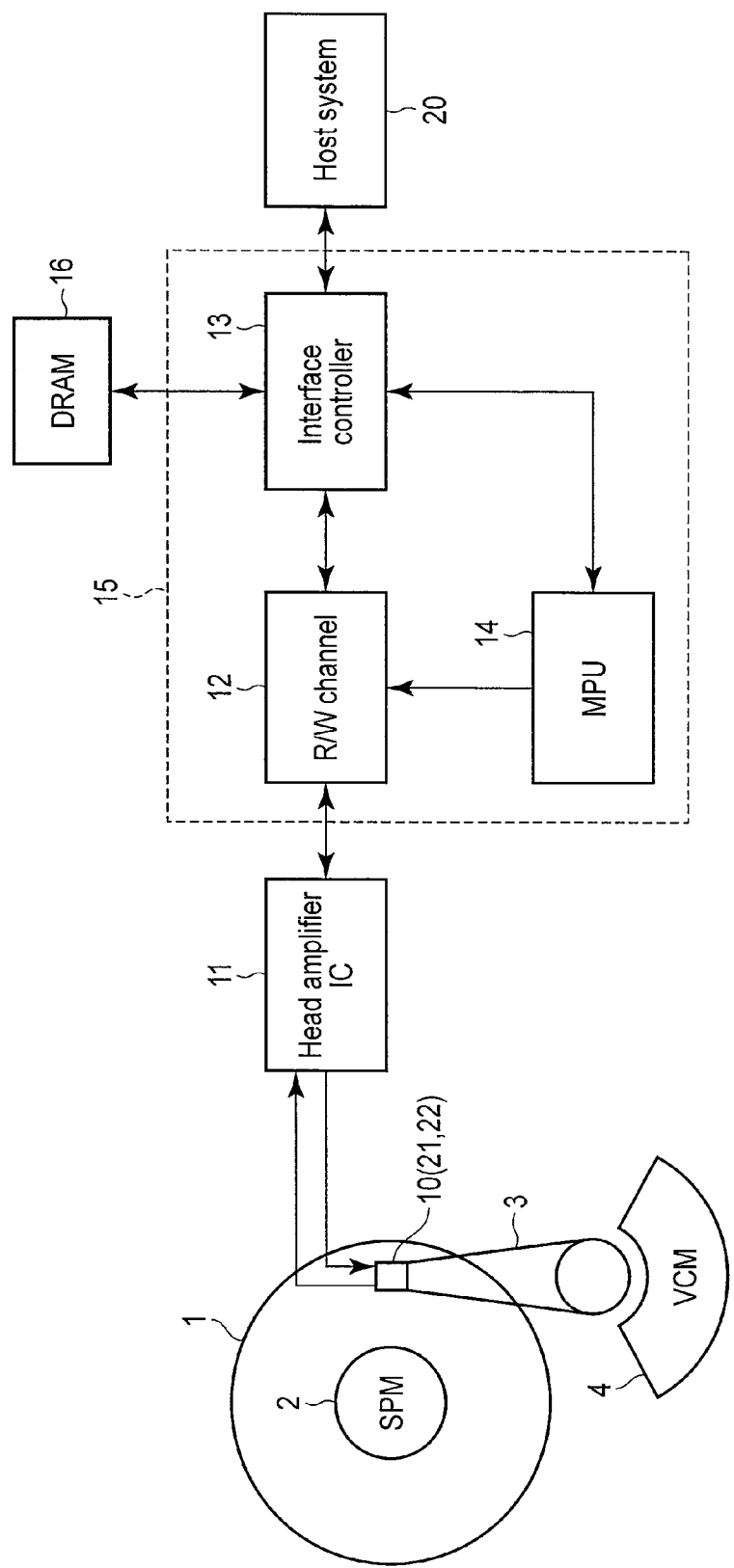
F I G. 1

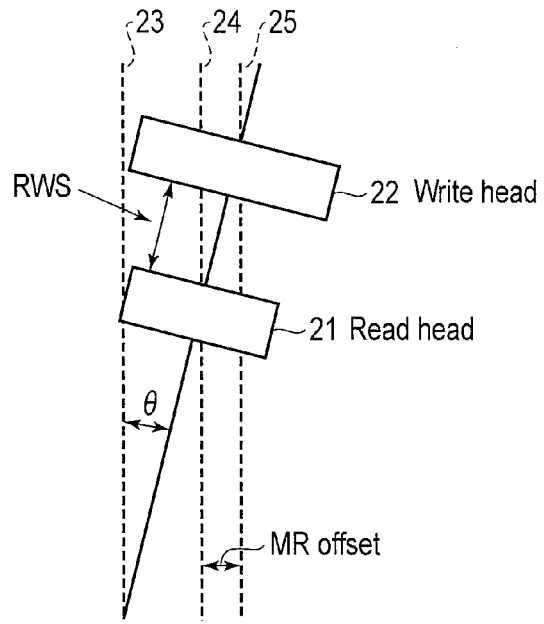
F I G. 2
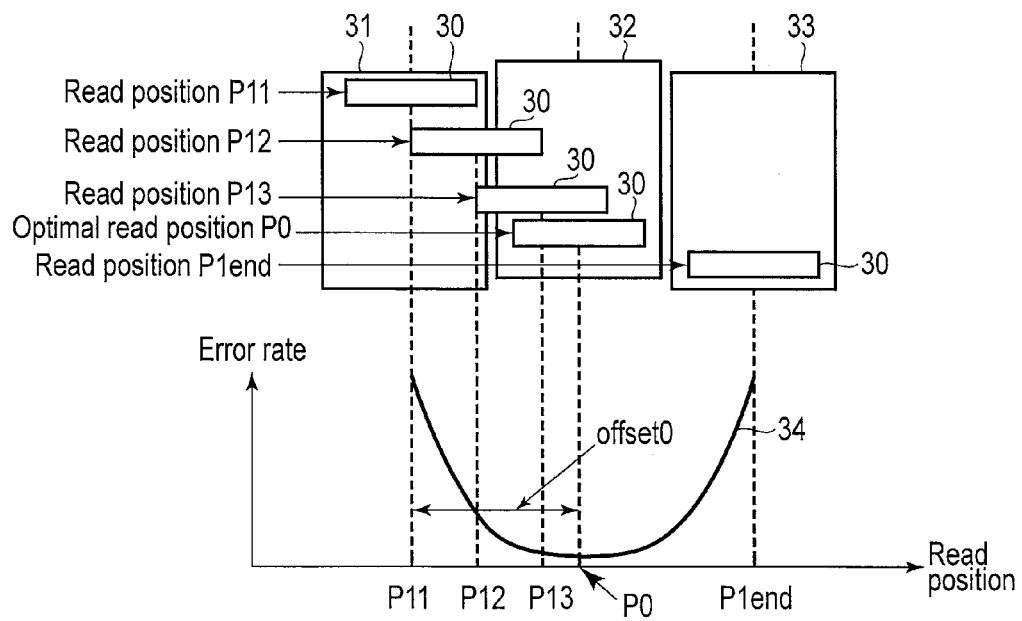
F I G. 3

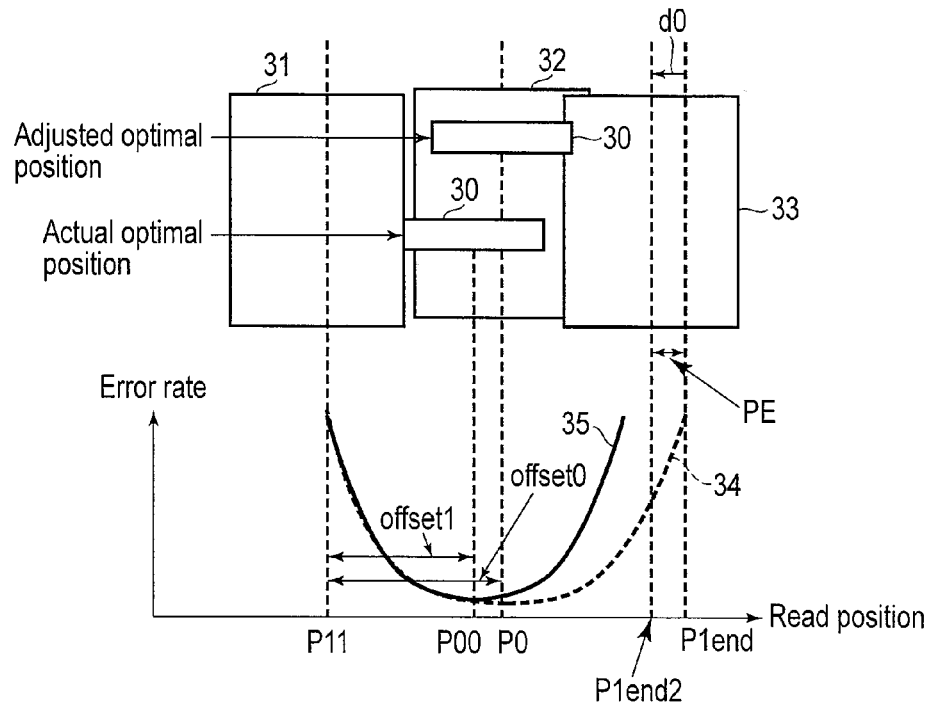
F I G. 4
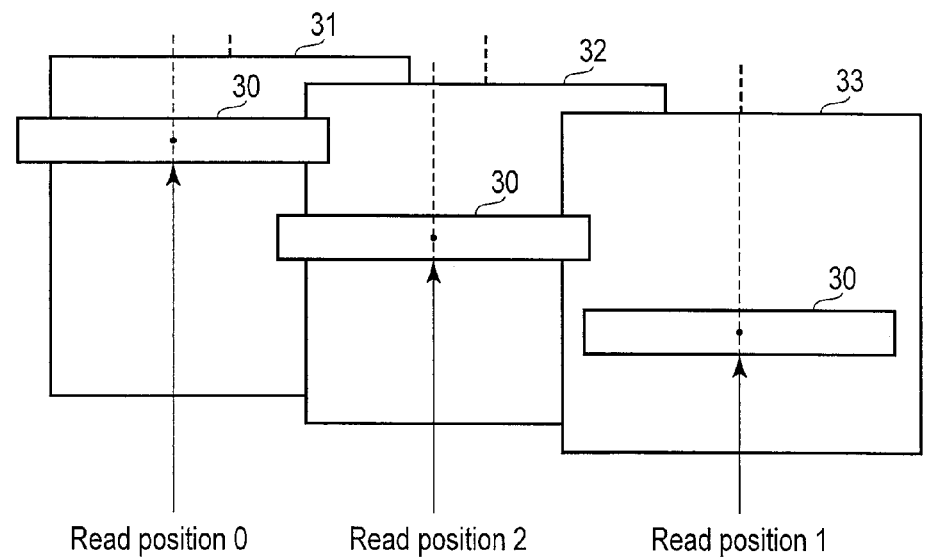
F I G. 5

READ/WRITE APPARATUS AND READ/WRITE METHOD

CROSS-REFERENCE TO RELATED APPLICATIONS

This application is based upon and claims the benefit of priority from Japanese Patent Application No. 2012-166262, filed Jul. 26, 2012, the entire contents of which are incorporated herein by reference.

FIELD

Embodiments described herein relate generally to a read/write apparatus and read/write method, which read data using a read head.

BACKGROUND

In recent years, a storage apparatus such as a magnetic disk apparatus which can read and write data has been developed. When data is read from a magnetic disk, the magnetic disk apparatus reads a written signal required to read data from a track written in the magnetic disk apparatus. In general, in the magnetic disk apparatus, the written signal is read by a read head required to read the written signal. The read head is independent of a write head used upon writing data.

It is demanded to write many data on the magnetic disk by writing tracks on the magnetic disk at a high density. At this time, since the tracks are written at a high density, the read head is required to be positioned at high accuracy. For this reason, the read head position where the written data can be read with the best quality is required to be adjusted in advance with respect to the read head position upon data writing. The written data has to be read at that read position. However, due to a deviation of a write position in an actual write/read operation, a read error often occurs even at the adjusted position of the read head which can read data with the best quality. When the read error occurs, the read position of the read head is corrected with respect to a written signal and the written signal is repetitively read by read retry processing until the written signal can be read.

However, when the read position of the read head is repetitively corrected, a processing time required to read the written signal is prolonged, thus lowering data read performance. When a plurality of tracks are written on the magnetic disk while they partially overlap each other, a practical track width from which the written signal can be read is often narrowed down. Even in such case, it is demanded to read the written signal without lowering the performance.

BRIEF DESCRIPTION OF THE DRAWINGS

FIG. 1 is an exemplary block diagram showing an example of the configuration of a magnetic disk apparatus according to an embodiment.

FIG. 2 is an exemplary view showing the positional relationship between a read head and write head with respect to a magnetic disk in the magnetic disk apparatus according to the embodiment.

FIG. 3 is an exemplary view showing offset adjustment in association with the read head incorporated in the magnetic disk apparatus according to the embodiment.

FIG. 4 is an exemplary view showing the relationship between a read head position, which is adjusted in advance, as shown in FIG. 3, and an optimal read head position upon reading according to the embodiment.

FIG. 5 is an exemplary view showing tracks written by a shingled write recording method on the magnetic disk of the magnetic disk apparatus according to the embodiment, and optimal read head positions.

DETAILED DESCRIPTION

Figure 6:
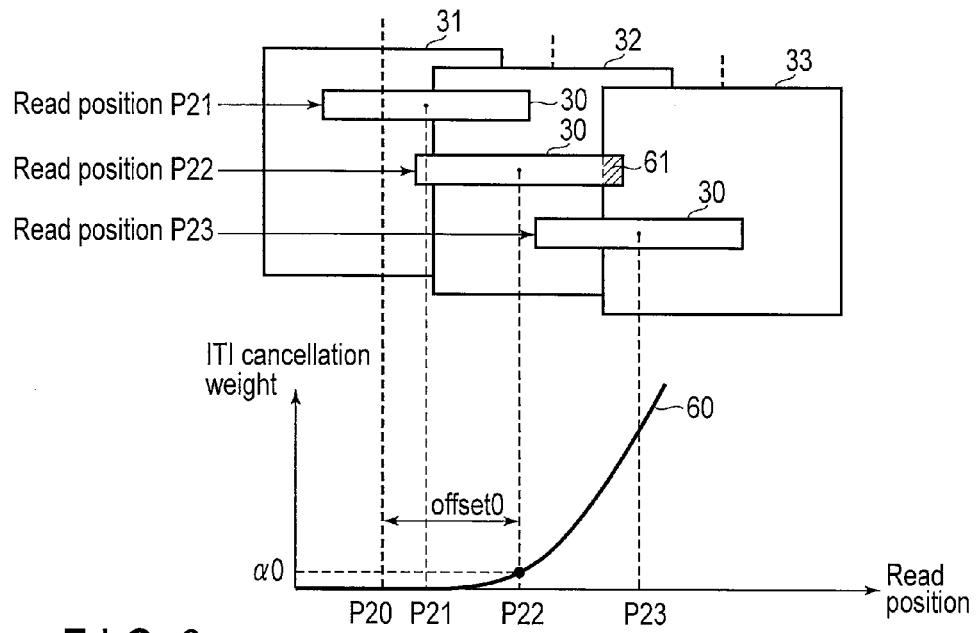
FIG. 6 is an exemplary view showing an offset adjustment method using an ITI (intertrack interference) cancellation weight for tracks written by the shingled write recording method on the magnetic disk of the magnetic disk apparatus according to the embodiment.

In general, according to at least one embodiment, a read/write apparatus includes a read module and a positioning module. The read module reads data of a predetermined data track using a read head. The positioning module positions the read head in accordance with an index indicating how much the read head reads data of a neighboring data track of the predetermined data track when the read head reads data of the predetermined data track.

An embodiment will be described hereinafter with reference to the drawings.

FIG. 1 is a block diagram showing the principal part of a magnetic disk apparatus according to this embodiment.

As shown in FIG. 1, the magnetic disk apparatus roughly includes a head-disk assembly (HDA), a head amplifier integrated circuit (to be referred to as a head amplifier IC hereinafter) 11, and a hard disk controller (HDC) 15.

The HDA includes a magnetic disk 1 as a recording medium, a spindle motor (SPM) 2, an arm 3 which mounts a head 10, and a voice coil motor (VCM) 4. The magnetic disk 1 is rotated by the spindle motor 2. The arm 3 and VCM 4 form an actuator. The actuator controls to move the head 10 mounted on the arm 3 to a designated position on the magnetic disk 1 by driving the VCM 4.

The head 10 includes a write head 22 and read head 21 mounted on a slider as a main body of the head 10. The read head 21 reads data written on data tracks on the magnetic disk 1 (to be referred to as "read" hereinafter). The write head 22 writes data on the magnetic disk 1 (to be referred to as "write" hereinafter).

The head amplifier IC 11 has a pre-amplifier and write driver. The pre-amplifier amplifies a read signal (to be referred to as an input signal hereinafter) read by the read head 21, and transfers the amplified read signal to a read/write (R/W) channel 12. On the other hand, the write driver transfers a write current according to write data output from the R/W channel 12 to the write head 22.

The HDC 15 is configured by a 1-chip integrated circuit including the R/W channel 12, an interface controller 13, and a microprocessor (MPU) 14. The R/W channel 12 includes a read channel used to execute signal processing of read data, and a write channel used to execute signal processing of write data.

The interface controller 13 controls data transfer between a host system 20 and the R/W channel 12.

The MPU 14 is a main controller of the magnetic disk apparatus. The MPU 14 executes servo-control for controlling the VCM 4 to perform positioning of the head 10.

The positional relationship between the read head 21 and write head 22 on the magnetic disk 1 will be described below with reference to FIG. 2.

A line which passes through the centers of the read head 21 and the write head 22 intersects with a track 23 of the magnetic disk 1 at a yaw angle θ. Note that since FIG. 2 is a partial enlarged view of the magnetic disk 1, the track 23 and head loci 24 and 25, which are originally curves (concentric circles), are illustrated as lines. A value of the yaw angle θ changes depending on the position (radial position) of the head 10 on the magnetic disk 1. A read write separation (RWS) is between the read head 21 and the write head 22, as shown in FIG. 2. Then, the head 10 moves while being tilted through the yaw angle θ with respect to the track in write and read operations. For this reason, a gap indicated by an MR offset in FIG. 2 is formed between the loci 25 and 24 of the write head 22 and read head 21. The MR offset is an offset amount required for the read head 21 to read data written on a track having the locus 25 as the center by the write head 22. In a read operation of a certain track, after the write head 22 is positioned to that track, the read head 21 is moved in the radial direction of the disk by a distance indicated by the MR offset, thereby positioning the read head 21 on the locus 25 of the write head 22, and appropriately reading data written on the magnetic disk 1.

The MR offset adjustment method will be described below with reference to FIG. 3.

FIG. 3 shows a case in which predetermined partial regions on three tracks on the magnetic disk 1 are defined as offset adjustment regions, in the positional relationship between the write head 22 and read head 21 with respect to the magnetic disk 1, as shown in FIG. 2. A written signal is written as data of a second track 32. Neighboring signals as crosstalk noise are written as data of first and third tracks 31 and 33. The MR offset is determined based on an error rate upon read the written signal of the second track 32. The error rate is an index indicating quality of a write/read signal like an SNR (Signal Noise Ratio) or the like. The MR offset is adjusted to optimize the error rate.

More specifically, in FIG. 3, the written signal of the second track 32 is read while moving the read head 30 in an order of read positions P11, P12, P13, and P1end, thus measuring error rates at the respective read positions. The read position P11 is a position of the read head 30 upon writing of the second track 32, and the read position P1end is a position spaced apart from the read position P11 by a predetermined distance. Note that the read head 30 in this case is obtained by projecting the read head 21 in FIG. 2 in the track direction, and can be considered as the read head 21 in consideration of the tilt of the read head 21 caused by the yaw angle θ shown in FIG. 2.

A lower graph in FIG. 3 shows error rate values at the read positions of the read head 30. Initially, the read head 30 is moved to the read position P11 (the center of the first track 31), and data of the second track 32 is read. Then, an error rate is calculated.

Note that to move the read head 30 to the read position P11 is to move the read head 30 so that the central position of the read head 30 matches that read position P11. In the following description, to move the read head 30 to the read position is to move the element so that the central position of the read head 30 matches that read position.

Next, the read head 30 is moved to the read position P12, and data of the second track 32 is read, and the error rate is calculated. Likewise, the read head 30 is moved in turn to the read positions P13, . . . , P1end to read data of the second track 32, and error rates are calculated. The above calculation results of the error rates are represented by a graph expressed by a bathtub curve 34. A read position P0 corresponding to the smallest error rate (optimal error rate) (that is, the read position P0 corresponding to a minimal value of the curve 34 in FIG. 3) is set as an optimal read position upon reading data of the second track 32. A distance between the read head position P11 upon writing and the optimal read position P0 is offset0, and MR offset=offset0 can be set upon reading the second track 32.

By setting the MR offset, as described above with reference to FIG. 3, written data can be read by the read head 21. However, in practice, in case that data is written on the magnetic disk 1 by the write head 22, neighboring tracks may be written to partially overlap each other, as shown in, for example, FIG. 4. In such case, even if the read head 30 is offset by offset0, that read position is not a read position where optimal signal quality can be obtained, and the written signal cannot be read to often cause an error. For this reason, the MR offset has to be changed (varied) to the read position free from any read error.

A practical example will be described below with reference to FIG. 4. In FIG. 4, it is assumed that a case in which the third track 33 is written to be shifted by d0 in a direction to approach the second track 32, and the third track 33 is written to partially overlap the second track 32. Initially, the position of the read head 30 is offset by the MR offset (=offset0) which is adjusted, as shown in FIG. 3, and is moved to the read position P0. In case that the MR offset adjustment described above with reference to FIG. 3 is executed if the tracks are written to partially overlap each other, as shown in FIG. 4, a lower graph related to error rates, as indicated by a curve 35 in FIG. 4, is obtained. Therefore, the value of an error rate obtained at the read position P0 is not smallest. For this reason, in order to improve the signal quality at the time of read, the MR offset has to be changed to an offset value indicated by offset1 in FIG. 4. In this embodiment, the MR offset is changed based on an ITI cancellation weight to be described below. Note that the ITI cancellation weight will be described later with reference to FIGS. 5 and 6.

FIG. 5 shows ideal read head positions upon reading tracks written by the shingled write recording method.

The shingled write recording method is a recording method to write tracks so that a subsequent neighboring track partially overlaps an end portion of the already written track on the magnetic disk 1 or the like. Since tracks are written at a high density by the shingled write recording method, the number of tracks which can be written on the magnetic disk 1 increases, thus increasing a recordable data volume on tracks.

Referring to FIG. 5, after the first track 31 is written, the second track 32 is written to partially overlap the first track 31, and the third track 33 is further written to partially overlap the second track 32. In a read operation, the read head is initially moved to a read position 1 indicating the central position of the third track 33 to read data written on the third track 33. Since the third track 33 has a larger width than the first and second tracks 31 and 32, it is insusceptible to crosstalk noise caused by a neighboring written signal. For this reason, it is easy to read data written on the third track 33. Hence, data which is read from the third track 33 and is decoded, can be used to read another track. For example, upon sequentially reading a track written immediately before a track (third track 33) which was written lastly by the shingled write recording method, since data written on the third track 33 has already been read, crosstalk noise caused by the third track 33 generated upon reading the second track 32 can be removed using an ITI cancellation function.

The ITI cancellation function is to make read access to the magnetic disk 1 while removing intertrack interference components (noise components) generated between tracks using data (ITI cancellation data) written on a neighboring track upon reading data written on tracks by the shingled write recording method. Note that data written on each track will also be described as data of each track in the following description.

In FIG. 5, upon reading the second track 32, data of the third track 33 is used as ITI cancellation data. By the ITI cancellation function, the influence of crosstalk noise caused by the written signal of the third track 33 is removed. Thus, data of the second track 32 can be read. Also, in FIG. 5, in order to read the second track 32 at a read position corresponding to a smallest error rate, it is required to read most signal components of the second track 32 in a region of the second track 32. Furthermore, in order to read the second track 32 at a read position corresponding a smallest error rate, it is required to set the central position of the read head 30 to get closer to a read position corresponding to smallest signal components as crosstalk noise of the first track 31.

As an index indicating how much the read head reads data of a neighboring data track of the predetermined data track when the read head reads data of the predetermined data track, an ITI cancellation weight is used. As will be described in detail later with reference to FIG. 6, an ITI cancellation weight can also be used as a parameter or the like required to subtract crosstalk noise generated upon reading a neighboring track from a signal to be read. Also, the ITI cancellation weight is determined according to a degree of the known neighboring track data to be read by the read head 21. For this reason, a relative position of a neighboring track with respect to the read head 21 can be predicted based on an increase/decrease in ITI cancellation weight. Then, the MR offset can be adjusted based on the predicted relative position.

The dependence between the ITI cancellation weight and position of the read head will be described below with reference to FIG. 6.

FIG. 6 assumes a case in which tracks, which are written at ideal write positions shown in FIG. 5 by the shingled write recording method, are to be read. Note that a description of the same configuration as that described with reference to FIG. 5 will not be repeated.

For example, in case that the read head 30 is located at a read position P22, the ITI cancellation weight is also an index which indicates a ratio of an overlapping region 61 between the read head 30 and third track 33 with respect to a region of the read head 30 shown in FIG. 6. The ITI cancellation weight is indicated by a lower graph of FIG. 6, as expressed by a curve 60. Note that this embodiment will explain the ITI cancellation weight associated with the second track 32 and the third track 33. However, since the same applies to the ITI cancellation weight associated with the first track 31 and the second track 32, a description thereof will not be given.

In FIG. 6, let the ITI cancellation weight be $\alpha 0$ in case that the read head 30 is located at a read position P22. $\alpha 0$ is the ITI cancellation weight in case that read error does not occur. $\alpha 0$ corresponds to an offset amount offset0 upon reading a track written at an ideal position by the shingled write recording method. $\alpha 0$ is also a value corresponding to a value of the smallest error rate. Note that the read error is that which occurs upon reading. What read error does not occur corresponds to what data to be read can be correctly read.

As shown in FIG. 6, the read head 30 at a read position P23 suffers a large influence of crosstalk noise related to the third track 33 since the read head 30 overlaps the third track 33 by a larger amount than the read head 30 at the read position P22. For this reason, the ITI cancellation weight value becomes larger than $\alpha 0$. On the other hand, the read head 30 at a read position P21 is spaced apart from the third track 33. The read head 30 at the read position P21 suffers a small influence of crosstalk noise related to the third track 33. For this reason, the ITI cancellation weight value becomes smaller than $\alpha 0$.

That is, as can be seen from FIG. 6, as the ITI cancellation weight is larger, the distance between the track (third track 33) with regard to crosstalk noise as a cause of signal quality deterioration and the read head 21 is smaller, and as the ITI cancellation weight is smaller, the distance between the third track 33 and read head 21 is larger. Therefore, by comparing the ITI cancellation weight $\alpha 0$ as a reference value with the current ITI cancellation weight, whether or not the relative distance between the read head 21 and third track 33 is small can be determined. Then, since a signal quality deterioration factor can be estimated, the signal quality can be improved by moving the position of the read head 21 in an appropriate direction.

Figure 7:
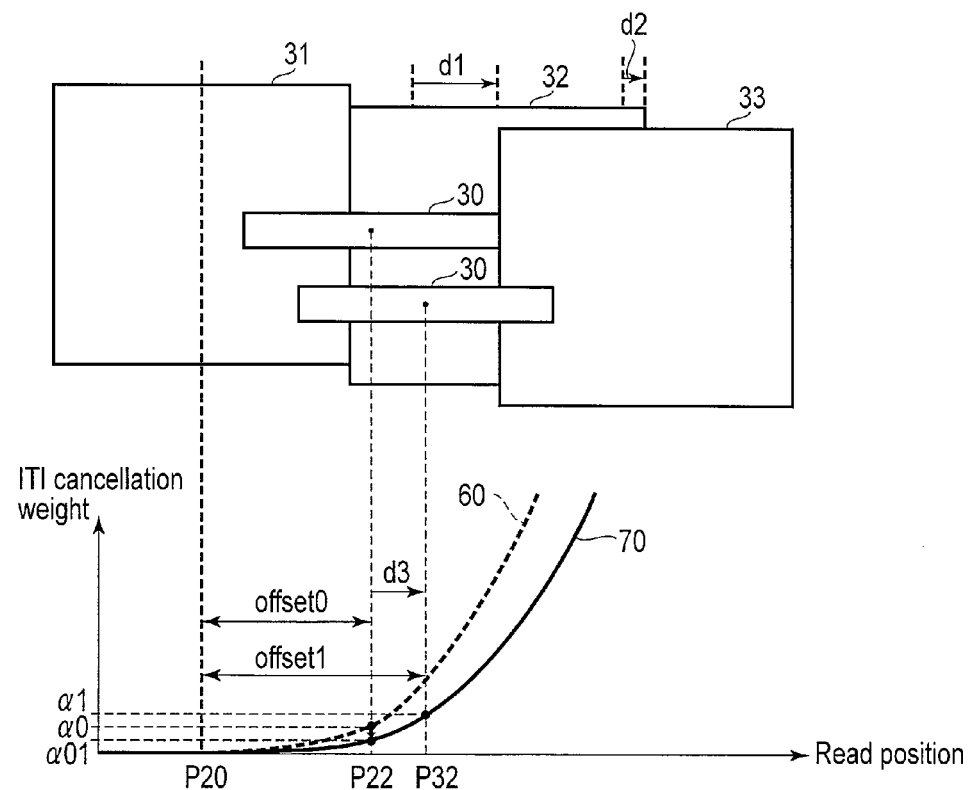
FIG. 7 is an exemplary view showing an example of an offset obtained by changing an offset, which is adjusted in advance as shown in FIG. 6, according to the ITI cancellation weight in the embodiment.

FIG. 7 shows ideal read head positions upon reading tracks written by the shingled write recording method.

FIG. 7 assumes a case in which a written signal on the second track 32 is to be read. In FIG. 7, the second and third tracks 32 and 33 are written to be respectively shifted by distances d1 and d2 in a direction from the second track 32 to the third track 33 (the right direction in FIG. 7; to be referred to as Direction1 hereinafter) compared to FIG. 5. Also, a curve 70 represents ITI cancellation weights obtained in association with the tracks written, as shown in FIG. 7.

Initially, the read head 30 is moved to the read position P22 corresponding to offset0 in FIG. 6 to read data of the second track 32, and to calculate an ITI cancellation weight for the read position P22. Since the third track 33 is written to be shifted in Direction1, an overlapping region between the read head 30 at the read position P22 and the third track 33 becomes smaller, and a calculated ITI cancellation weight $\alpha 01$ is smaller than $\alpha 0$. In other words, as can be understood from the calculated ITI cancellation weight $\alpha 01$ smaller than $\alpha 0$, the relative distance between the read head 30 and third track 33 becomes larger, that is, the third track 33 is written to be shifted in Direction1. If the second track 32 is not shifted by the distance d1 in Direction1, since the ITI cancellation weight becomes smaller and the influence of crosstalk noise caused by the third track 33 is decreased, read error may not occur.

However, since in FIG. 7 it is assumed that a read error occurs although the second track 32 is read at the read position P22, the read head 30 has to be moved to a more optimal read position. If a read error occurs although the calculated ITI cancellation weight is smaller than $\alpha 0$, it is considered that the second track 32 is shifted in Direction1, and written signal components of the second track 32, which can be read by the read head 30, are decreased, as shown in FIG. 7. For this reason, by moving the read head 30 by a distance d3 in Direction1, in other words, by changing the MR offset to offset1 (=offset0+d3) shown in FIG. 7 since the MR offset is changed in Direction1, the signal quality can be improved, thus avoiding occurrence of a read error. An ITI cancellation weight obtained by the read head 30 being moved to a read position P32 is α1.

Another example of the processing required to adjust the MR offset according to the ITI cancellation weight will be described below with reference to FIG. 8.

Unlike in the case of FIG. 7, in FIG. 8 it is assumed that the second track 32 is written to be shifted by a distance d4 in Direction1, and the third track 33 is written to be shifted by a distance d5 in a direction from the second track 32 to the first track 31 (the left direction in FIG. 8; to be referred to as Direction2 hereinafter). Also, it is assumed that the distance d5 is larger than the distance d4. Note that the second track 32 may be written to be shifted by the distance d4 in Direction2 (in this case, the distance d4 may be larger than the distance d5). In this case, as can be seen from an ITI cancellation weight graph in FIG. 8, the ITI cancellation weight α01 obtained in case that the second track 32 is read at the read position P22 is larger than α0. Note that a curve 80 indicates ITI cancellation weight values for respective read positions in case that the tracks are written, as shown in FIG. 8.

The obtained ITI cancellation weight larger than α0 means that crosstalk noise components received from the third track 33 increase, and the relative distance between the read head 30 and third track 33 is small, that is, the third track 33 is written to be shifted in Direction2 with respect to the second track 32. Therefore, in case that a read error occurs at the read position P22, it is considered that some written signal components of the second track 32 are erased by writing the third track 33 more than ordinary writing, and written signal components of the second track 32, which can be read by the read head 30, are decreased. For this reason, by moving the read head 30 in Direction2, in other words, by changing the MR offset to offset1 (=offset0−d6) which is smaller than offset0 by a distance d6 since the MR offset is considered to be changed in Direction2, the signal quality can be improved, thus avoiding occurrence of a read error.

Still another example of the processing required to adjust the MR offset according to the ITI cancellation weight will be described below with reference to FIG. 9.

Figure 9:
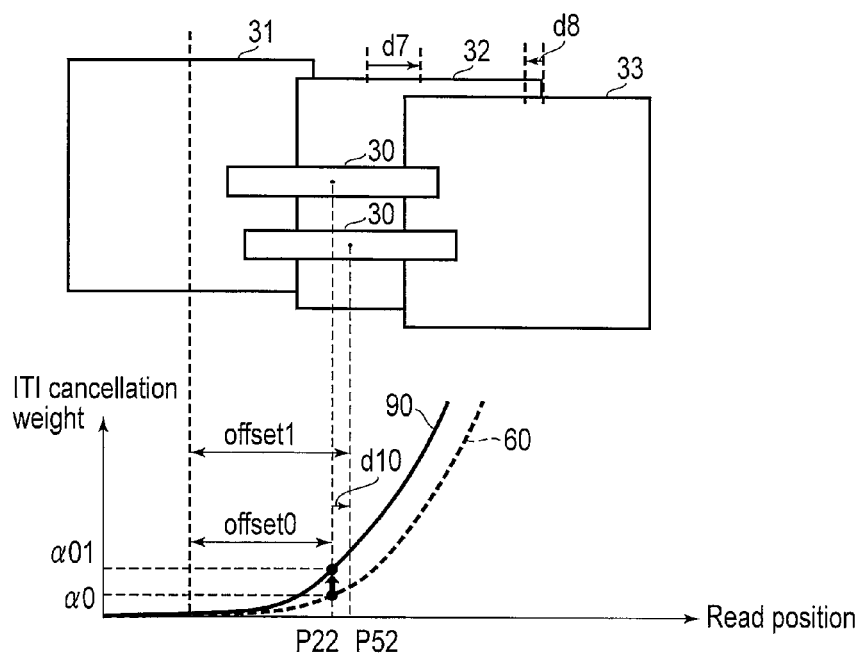
FIG. 9 is an exemplary view showing still another example of an offset obtained by changing an offset, which is adjusted in advance as shown in FIG. 6, according to the ITI cancellation weight in the embodiment.

Unlike in the case of FIG. 7, in FIG. 9 it is assumed that the second track 32 is written to be shifted by a distance d7 in Direction1, and the third track 33 is written to be shifted by a distance d8 in Direction2. Also, assume that the distance d8 is smaller than the distance d7.

In this case, as can be seen from an ITI cancellation weight graph of FIG. 9, the ITI cancellation weight α01 obtained when the second track 32 is read at the read position P22 is larger than α0. Note that a curve 90 represents ITI cancellation weight values for respective read positions if the tracks are written as shown in FIG. 9.

The obtained ITI cancellation weight larger than α0 means that crosstalk noise components received from the third track 33 are increased, and the relative distance between the read head 30 and third track 33 is small, that is, the third track 33 is written to be shifted in Direction2 with respect to the second track 32. Therefore, in case that a read error occurs at the read position P22, occurrence of a read error may be avoided by moving the read head 30 in Direction2 as in the case of FIG. 8, in other words, by changing the MR offset to offset1 smaller than offset0 since the MR offset is considered to be changed in Direction2 as in the case of FIG. 8.

Figure 8:
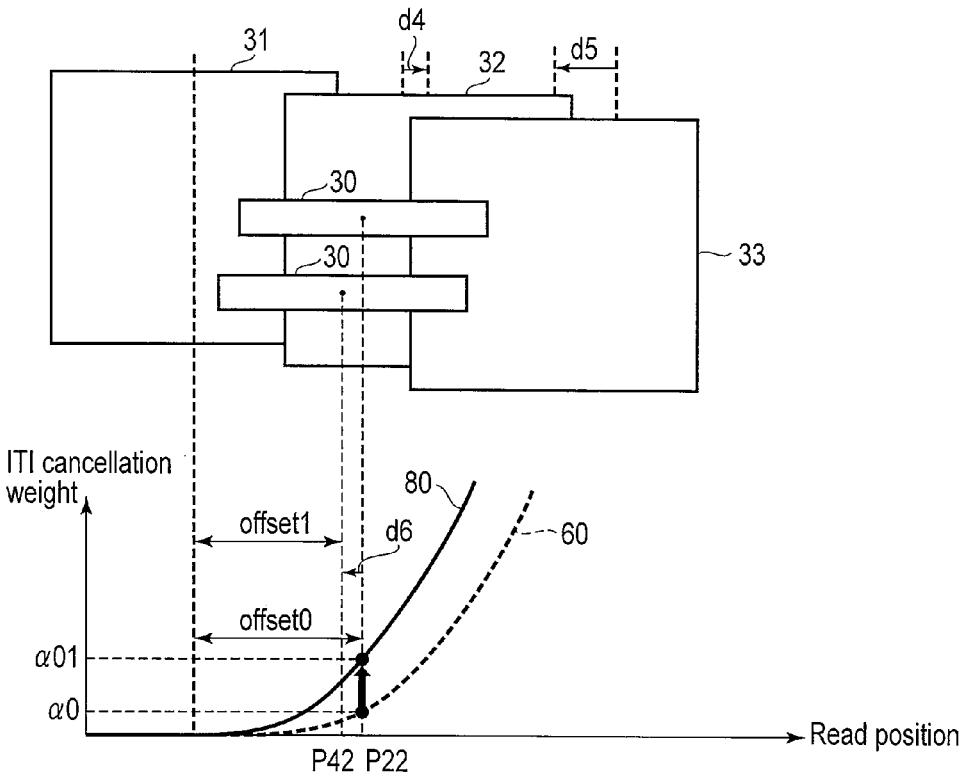
FIG. 8 is an exemplary view showing another example of an offset obtained by changing an offset, which is adjusted in advance as shown in FIG. 6, according to the ITI cancellation weight in the embodiment.

However, unlike in FIG. 8, in case that the distance d8 is smaller than the distance d7, in other words, in case that the second track 32 has a larger magnitude (absolute value) of a track shift than that of the third track 33 although the direction is different, a read error cannot be avoided even if the read head 30 is moved in Direction2. Therefore, in case of FIG. 9, for example, if a read error cannot be avoided after the read head 30 is moved in Direction2, the read head 30 is then moved in Direction1, in other words, the MR offset is changed to offset1 (=offset0+d10) larger by a distance d10 than offset0, thereby avoiding occurrence of a read error.

An example of read retry processing executed in case that a read error occurs will be described below with reference to FIG. 10.

Initially, read processing is started in block 99. The read head 21 at the time of this read processing is positioned by offset0, which is adjusted in advance, as described above with reference to FIG. 3. It is checked in block 100 whether or not a read error occurs. If a read error does not occur, the read processing ends. If a read error occurs, the process advances to block 101, and read processing (read retry processing) is started again. If a read error occurs in block 100, it is considered that, for example, the tracks are correctly written on the magnetic disk 1, as described above with reference to FIG. 5, but the offset position of the read head 21 is shifted from the offset0, thus causing a read error. For this reason, the read retry processing is executed in block 102 without changing the offset value (MR offset) of the read head 21.

After the read retry processing in block 102, it is determined in block 103 whether or not a read error occurs. If a read error does not occur, the read processing ends. If a read error occurs, the process advances to block 104.

In block 104, an ITI cancellation weight is evaluated. The evaluation of the ITI cancellation weight is to calculate an ITI cancellation weight from parameters or the like obtained as a result of, for example, the read retry processing in block 102. More specifically, the evaluation is to calculate the value α01 described above with reference to FIGS. 7, 8, and 9, and the like. In block 105, the predetermined value α0 of the ITI cancellation weight is compared with the value α01. If the value α01 is equal to or larger than the value α0, in other words, if the ITI cancellation weight is increased, the process advances to block 106.

In block 106, read retry processing is executed by changing the MR offset by a prescribed value in Direction2. Note that the prescribed value is, for example, a predetermined value which is set in advance. It is determined in block 107 whether or not a read error occurs. If a read error does not occur, the read processing ends. If a read error occurs, the process advances to block 108.

It is determined in block 108 whether or not the changed MR offset (offset1) is an upper limit value. If the offset1 is not the upper limit value, the process returns to block 106, and read retry processing is executed by changing offset1 by the prescribed value in Direction2. If the offset1 is the upper limit value in block 108, the process advances to block 109.

In block 109, the read retry processing is executed by changing offset1, which becomes the upper limit value, by the prescribed value in Direction1. It is determined in block 110 whether or not a read error occurs. If a read error does not occur in block 110, the read processing ends. If a read error occurs, the process advances to block 111 to determine whether or not the offset1 changed in block 109 is an upper limit value (for example, an offset value corresponding to the position P1end in FIG. 3). If the offset1 changed in block 109 is the upper limit value, a read error which occurs is considered as an uncorrectable error, and the read processing ends. If the offset1 changed in block 109 is not the upper limit value, the process returns to block 109, and read retry processing is executed by changing the offset1, which has changed in block 109, by the prescribed value in Direction1.

On the other hand, if the value α01 is smaller than the value α0 in block 105, in other words, if the ITI cancellation weight is decreased, the process advances to block 109, and read retry processing is executed by changing the MR offset by the prescribed value in Direction1.

Figure 10:
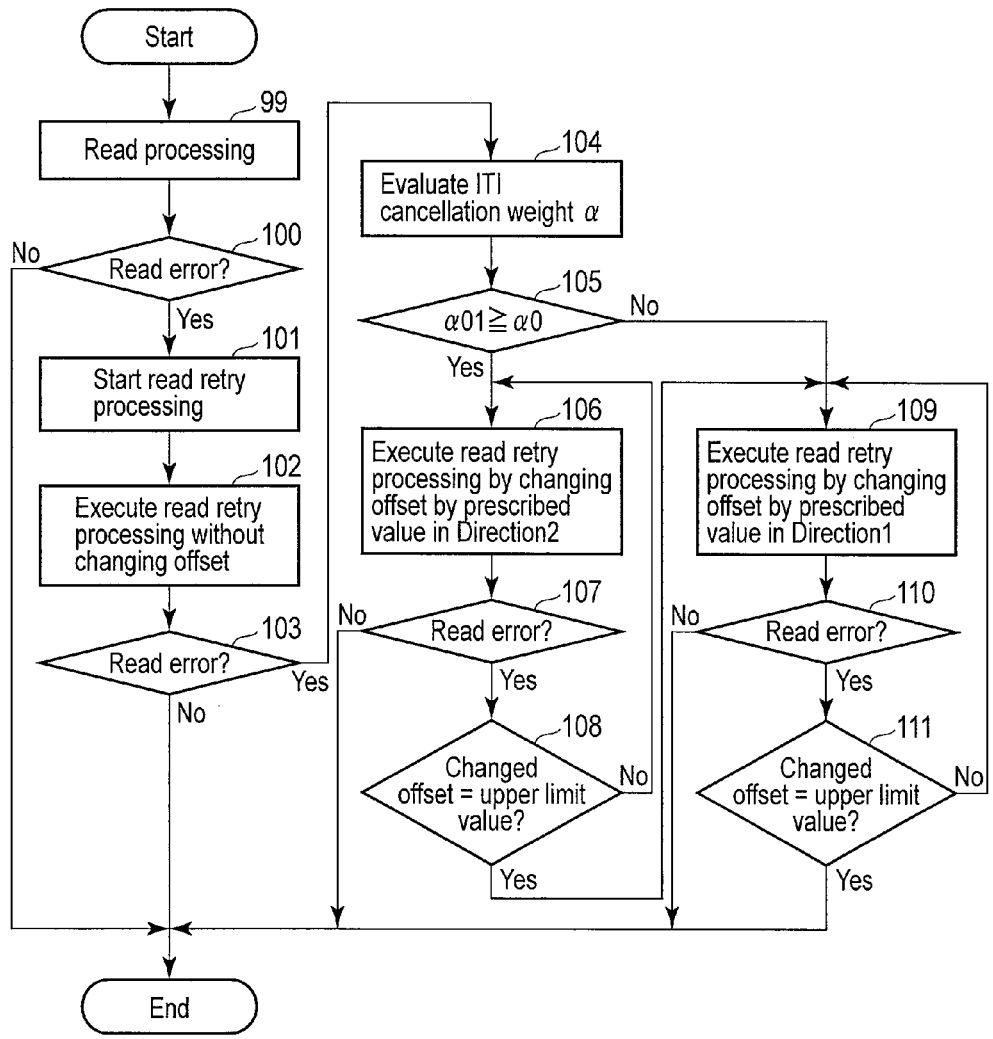
FIG. 10 is an exemplary flowchart showing an example of the processing sequence for changing an offset, which is adjusted in advance as shown in FIG. 6, according to the ITI cancellation weight in the embodiment.

In this manner, by executing the read retry processing, as shown in FIG. 10, the moving direction of the read head 21 can be determined according to the ITI cancellation weight. For this reason, the read position of the read head 21, wherein a read error does not occur, can be determined within a short period of time.

Another example of the read retry processing will be described below with reference to FIG. 11. Note that a description of the same processes as those described with reference to FIG. 10 will not be repeated.

In the read retry processing shown in FIG. 10, before execution of the read retry processing again after the offset direction of the read head 21 is determined according to the ITI cancellation weight, the read head 21 is further offset in the same direction (for example, Direction1 if the offset direction is Direction1).

Figure 11:
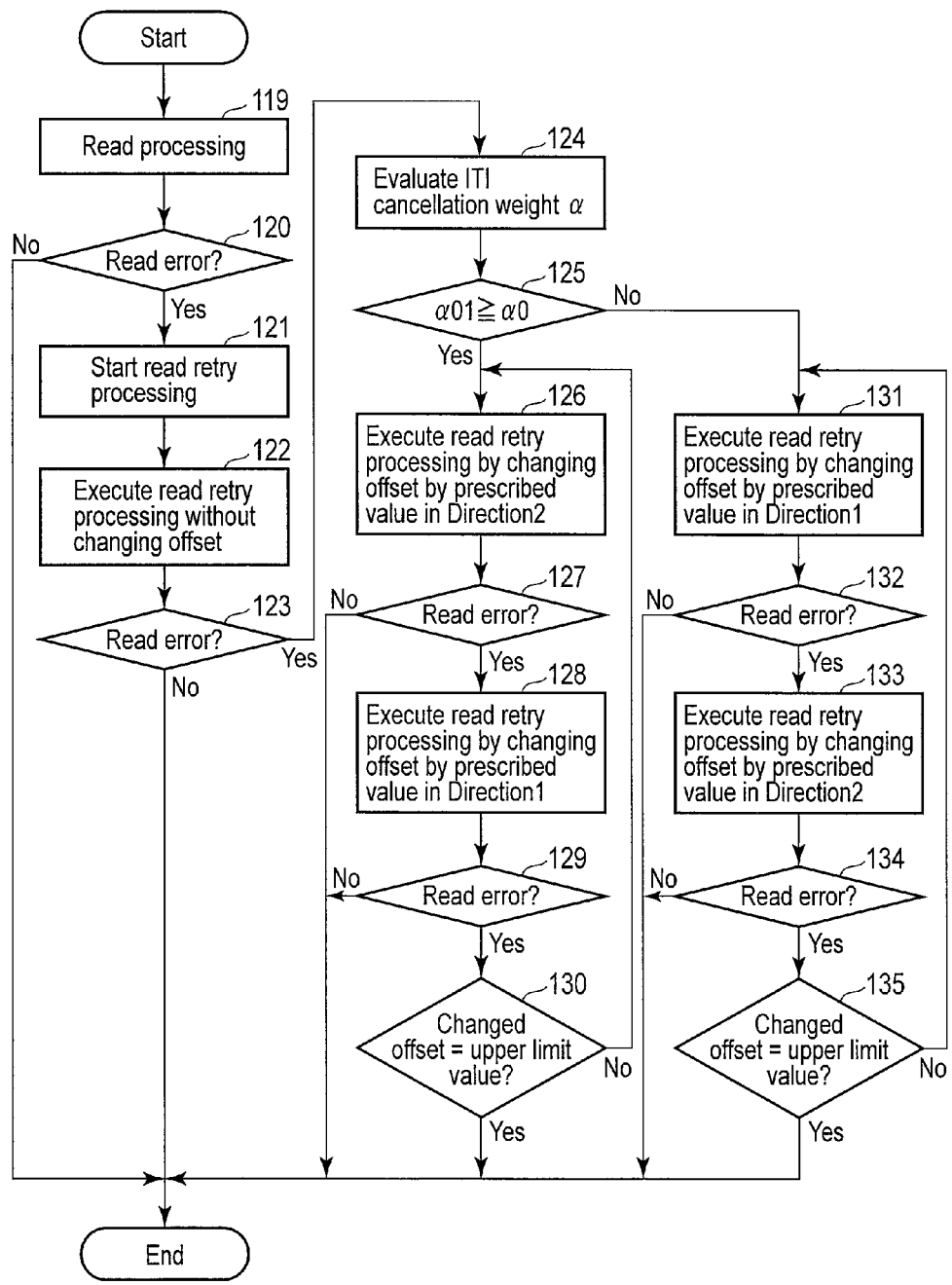
FIG. 11 is an exemplary flowchart showing another example of the processing sequence for changing an offset, which is adjusted in advance as shown in FIG. 6, according to the ITI cancellation weight in the embodiment.

On the other hand, in the read retry processing shown in FIG. 11, in case that the read retry processing is repeated after the offset direction of the read head 21 is determined according to the ITI cancellation weight, the read retry processing is executed by changing the offset direction.

More specifically, if the value α01 is equal to or larger than the value α0 in block 125, the process advances to block 126. In block 126, read retry processing is executed by changing the MR offset by the prescribed value in Direction2. It is then determined in block 127 whether or not a read error occurs. If a read error does not occur, the read processing ends. If a read error occurs, the process advances to block 128. In block 128, read retry processing is executed by changing the offset value (offset1), which has been changed in block 126, by the prescribed value in Direction1. It is determined in block 129 whether or not a read error occurs. If a read error occurs, it is determined in block 130 if the offset value changed in block 128 is an upper limit value. If the offset value changed in block 128 is the upper limit value, a read error which occurs is considered as an uncorrectable error, thus ending the read processing. If the offset value changed in block 128 is not the upper limit value in block 130, the process returns to block 126, and read retry processing is executed by changing the offset value changed in block 128 by the prescribed value in Direction2. Note that in the second and subsequent cycles, it is preferable to increase the prescribed value.

On the other hand, if the value α01 is smaller than the value α0 in block 125, the process advances to block 131. In block 131, read retry processing is executed by changing the MR offset by the prescribed value in Direction1. It is then determined in block 132 whether or not a read error occurs. If a read error does not occur, the read processing ends. If a read error occurs, the process advances to block 133. In block 133, read retry processing is executed by changing the offset value (offset1), which has been changed in block 131, by the prescribed value in Direction2. It is determined in block 134 whether or not a read error occurs. If a read error occurs, it is determined in block 135 whether or not the changed offset value is the upper limit value. If the changed offset value is the upper limit value in block 135, a read error which occurs is considered as an uncorrectable read error, thus ending the read processing. If the changed offset value is not the upper limit value in block 135, the process returns to block 131. Then, read retry processing is executed by changing the offset value changed in block 133 by the prescribed value in Direction1. Note that in the second and subsequent cycles, it is preferable to increase the prescribed value.

In this way, by executing the read retry processing, as shown in FIG. 11, the offset direction of the read head 21 is determined according to the ITI cancellation weight. After the offset direction is determined, the read head 21 is offset in the determined direction. If a read error occurs, the offset direction is inverted alternately. For this reason, the position of the read head 21, wherein a read error does not occur, can be determined within a shorter period of time than the conventional read retry processing which cannot specify a direction to be offset.

As described above, according to this embodiment, since the position of the read head 21 is corrected using the ITI cancellation weight calculated by the ITI cancellation function, a read retry time can be shortened, thus improving the performance of the magnetic disk apparatus. Even if the read head is positioned using an offset, which is adjusted in advance, if tracks are written to be shifted, a read error occurs, and the read head has to be further offset. In this embodiment, the offset direction, wherein a read error does not occur, can be estimated based on the ITI cancellation weight. For this reason, the read retry processing time can be shortened, thus improving the apparatus performance. More specifically, the read head is shifted in one of two directions depending on an increase/decrease in the ITI cancellation weight from the reference value. For this reason, the shift range can be halved, and a time required to detect an optimal read position can also be halved. A read error occurs depending on the relative position between the neighboring track and the read head. For this reason, the read head is moved using the ITI cancellation weight which changes according to a degree of overlapping between the neighboring track and read head, thus decreasing read errors.

Note that the case in which the ITI cancellation weight is used as an index indicating how much the read head reads data of a neighboring data track of the predetermined data track when the read head reads data of the predetermined data track, has been explained in this embodiment. However, this index may be an index other than the ITI cancellation weight, which indicates how much the read head reads data of a neighboring data track of the predetermined data track when the read head reads data of the predetermined data track.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A read/write apparatus comprising:
a magnetic disc comprising data tracks, data being written in the data tracks while a predetermined data track and a neighboring data track partially overlap;
a read head configured to read the data from the magnetic disc; and
a controller, wherein the controller is configured to read data of the predetemined data track using the read head and position the read head in accordance with an inter-track interference cancellation weight as an index indicating how much the read head reads data of the neighboring data track of the predetermined data track when the read head reads data of the predetermined data track, wherein the controller is configured to change a read position of the read head in accordance with the index, and to move the read head to the changed read position, a value of the index is proportional to an overlapping between the predetermined data track and the neighboring data track, the controller is configured to move the read head in a direction to approach the neighboring data track when the value of the index is smaller than a predetermined value, the controller is further configured to execute, when a read error occurs, read retry processing of data of the predetermined data track using the read head by changing a moving amount from a pre-adjusted read position, and the controller is configured to execute the read retry processing by changing the moving amount in a direction to approach the neighboring data track which interferes with the predetermined data track when the read error occurs at the pre-adjusted read position, and when the value of the index is smaller than the predetermined value, or moving the read head in a direction to approach the neighboring data track which interferes with the predetermined data track in a first retry sequence, and changing the moving amount alternately in a direction to be separated away from the neighboring data track and the direction to approach the neighboring data track when the read error occurs at the pre-adjusted read position, and when the value of the index is smaller than the predetermined value.

2. A read/write apparatus comprising:

a magnetic disc comprising data tracks, data being written in the data tracks while a predetermined data track and a neighboring data track partially overlap;

a read head configured to read the data from the magnetic disc; and a controller, wherein the controller is configured to read data of the predetermined data track using the read head and position the read head in accordance with an intertrack interference cancellation weight as an index indicating how much the read head reads data of the neighboring data track of the predetermined data track when the read head reads data of the predetermined data track, wherein the controller is configured to change a read position of the read head in accordance with the index, and to move the read head to the changed read position, a value of the index is proportional to an overlapping between the predetermined data track and the neighboring data track, the controller is configured to move the read head in a direction to be separated away from the neighboring data track when the value of the index is larger than a redetermined value, the controller is further configured to execute, when a read error occurs, read retry processing of data of the predetermined data track using the read head by changing a moving amount from a pre-adjusted read position, and the controller is configured to execute the read retry processing by changing the moving amount in a direction to be separated away from the neighboring data track which interferes with the predetermined data track, when the read error occurs at the pre-adjusted read position, and when the value of the index is larger than the predetermined value, and subsequently changing the moving amount in a direction to approach the neighboring data track when the read error occurs even after the moving amount in the direction to be separated away from the neighboring data track reaches a maximum amount, or moving the read head in the direction to be separated away from the neighboring data track which interferes with the predetermined data track, and changing the moving amount alternately in a direction to approach the neighboring data track and the direction to be separated away from the neighboring data track when the read error occurs at the pre-adjusted read position, and when the value of the index is larger than the predetermined value.

3. A method for positioning a read head used to read data from a magnetic disc comprising data tracks, the data being written in the data tracks while a predetermined data track and a neighboring data track partially overlap, the method comprising:

reading data of a predetermined data track using the read head; and positioning the read head according to an intertrack interference cancellation weight in the recording method as an index indicating how much the read head reads data of the neighboring data track of the predetermined data track when the read head reads data of the predetermined data track, wherein the positioning comprises:

changing a read position of the read head in accordance with the index; and moving the read head to the changed read position, wherein a value of the index is proportional to an overlapping between the predetermined data track and the neighboring data track, the positioning comprises moving the read head in a direction to approach the neighboring data track when the value of the index is smaller than a predetermined value, the method, further comprising:

executing, when a read error occurs, read retry processing of data of the predetermined data track using the read head by changing a moving amount from a read position which is adjusted in advance by a predetermined method; and executing the read retry processing by changing the moving amount in a direction to approach the neighboring data track which interferes with the predetermined data track when the read error occurs at the read position, which is adjusted by the predetermined method, and when the value of the index is smaller than the predetermined value, or moving the read head in a direction to approach the neighboring data track which interferes with the predetermined data track in a first retry sequence and changing the moving amount alternately in a direction to be separated away from the neighboring data track and the direction to approach the neighboring data track when the read error occurs at the read position, which is adjusted by the predetermined method, and when the value of the index is smaller than the predetermined value.

4. A method for positioning a read head used to read data from a magnetic disc comprising data tracks, the data being written in the data tracks while a predetermined data track and a neighboring data track partially overlap, the method comprising:

reading data of a predetermined data track using the read head; and positioning the read head according to an intertrack interference cancellation weight in the recording method as an index indicating how much the read head reads data of the neighboring data track of the predetermined data track when the read head reads data of the predetermined data track, wherein the positioning comprises:

changing a read position of the read head in accordance with the index; and moving the read head to the changed read position, wherein a value of the index is proportional to an overlapping between the predetermined data track and the neighboring data track, the positioning comprises moving the read head in a direction to be separated away from the neighboring data track when the value of the index is larger than a redetermined value, the method further comprising:

executing, when a read error occurs read retry processing of data of the predetermined data track using the read head by changing a moving amount from a read position, which is adjusted in advance by a predetermined method;

executing the read retry processing by changing the moving amount in a direction to be separated away from the neighboring data track which interferes with the predetermined data track when the read error occurs at the read position, which is adjusted by the predetermined method, and when the value of the index is larger than the predetermined value, and subsequently changing the moving amount in a direction to approach the neighboring data track when the read error occurs even after the moving amount in the direction to be separated away from the neighboring data track reaches a maximum amount or moving the read head in the direction to be separated away from the neighboring data track which interferes with the predetermined data track and changing the moving amount alternately in a direction to approach the neighboring data track and the direction to be separated away from the neighboring data track when the read error occurs at the read position, which is adjusted by the predetermined method, and when the value of the index is larger than the predetermined value.

* * * * *